(12) United States Patent
Chopinet et al.

(10) Patent No.: US 9,822,031 B2
(45) Date of Patent: Nov. 21, 2017

(54) ENAMEL COMPOSITION FOR GLASS-CERAMIC

(75) Inventors: Marie-Helene Chopinet, Paris (FR); Maike Hillers, Paris (FR); Caroline Faillat, Belleau (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 944 days.

(21) Appl. No.: 13/517,425

(22) PCT Filed: Dec. 13, 2010

(86) PCT No.: PCT/FR2010/052683
§ 371 (c)(1),
(2), (4) Date: Jun. 20, 2012

(87) PCT Pub. No.: WO2011/083231
PCT Pub. Date: Jul. 14, 2011

(65) Prior Publication Data
US 2012/0263957 A1    Oct. 18, 2012

(30) Foreign Application Priority Data
Jan. 5, 2010  (FR) ...................................... 10 50031

(51) Int. Cl.
| | | |
|---|---|---|
| C03C 3/089 | (2006.01) | |
| C03C 3/091 | (2006.01) | |
| C03C 8/02 | (2006.01) | |
| C03C 8/14 | (2006.01) | |
| C03C 8/16 | (2006.01) | |
| C03C 17/04 | (2006.01) | |

(52) U.S. Cl.
CPC .............. *C03C 3/089* (2013.01); *C03C 3/091* (2013.01); *C03C 8/02* (2013.01); *C03C 8/14* (2013.01); *C03C 17/04* (2013.01)

(58) Field of Classification Search
None
See application file for complete search history.

(56) References Cited

U.S. PATENT DOCUMENTS

| | | | | |
|---|---|---|---|---|
| 4,749,665 A | * | 6/1988 | Yano et al. ...................... 501/32 |
| 5,061,658 A | * | 10/1991 | Dorer et al. ..................... 501/17 |
| 5,326,728 A | | 7/1994 | Boury et al. | |
| 6,924,246 B2 | * | 8/2005 | Kato et al. ....................... 501/16 |
| 7,611,774 B2 | * | 11/2009 | Cotlear De Witzmann et al. .............................. 428/432 |
| 2006/0189470 A1 | * | 8/2006 | Mitra ............................... 501/21 |

FOREIGN PATENT DOCUMENTS

| | | |
|---|---|---|
| EP | 0 460 863 | 12/1991 |
| EP | 0 771 765 | 5/1997 |
| JP | 2002 255584 | 9/2002 |

OTHER PUBLICATIONS

English language translation of Written Opinion dated Aug. 2, 2012 in PCT/FR2010/052683 filed Dec. 13, 2010.
International Search Report dated Feb. 23, 2011 in PCT/FR10/52683 Filed Dec. 13, 2010.

* cited by examiner

*Primary Examiner* — David Sample
(74) *Attorney, Agent, or Firm* — Oblon, McClelland, Maier & Neustadt, L.L.P.

(57) ABSTRACT

Enamel composition, in particular intended for covering a glass pane of a fireplace insert, comprising at least one glass frit, at least one pigment in a content varying from 40 to 65% of the total weight of the enamel, preferably from 45 to 60%, and optionally at least one vehicle or medium, characterized in that the glass frit comprises the following constituents, within the limits defined below, limits included, expressed as percentages by weight of the total weight of the frit:

| | |
|---|---|
| $SiO_2$ | 45-65% |
| $Al_2O_3$ | 0-13% |
| $B_2O_3$ | 23-55% |
| $Na_2O$ | 0-10% |
| $K_2O$ | 0-10% |
| $Li_2O$ | 0-10%. |

20 Claims, No Drawings

ENAMEL COMPOSITION FOR GLASS-CERAMIC

The present invention relates to an enamel composition having a high content of boron oxide, intended for covering, in particular, a glass pane of a fireplace insert; the present invention also relates to a process for applying such an enamel to a glass substrate by screen printing and to a glass-ceramic plate covered with such an enamel.

Fireplaces with an insert make it possible to achieve thermal performances that are much greater than conventional open-hearth fireplaces. These fireplaces with a glass panel are currently experiencing great development and the manufacturers are seeking numerous esthetic solutions to make it possible to harmoniously integrate the various models into dwellings. The inserts are preferably made with glass that has a low thermal expansion coefficient, ideally this is a glass-ceramic plate of $LiO_2$—$Al_2O_3$—$SiO_2$ (commonly known under the name LAS) type, the expansion coefficient of which is overall zero or very low (the absolute value of the expansion coefficient is typically less than or equal to $15 \times 10^{-7}$/K, or even $5 \times 10^{-7}$/K).

One solution used in order to integrate the inserts into the decor as best possible is to cover them, completely or partly, with an enamel of small thickness. The enamel may advantageously be used to mask elements, such as silicone seals intended to assemble various parts to the insert panels. It may also be used to simulate a television screen effect when it outlines a frame by covering, for example, the edges of a front insert panel of a fireplace.

The enamels known from the prior art are unsuitable for such a use on a glass-ceramic, because they contain toxic metals, such as lead oxide PbO, and/or because they do not have a suitable opacity or color for producing the desired esthetic effect. Ideally, for such an application to a glass pane of a fireplace insert, it is desired to have an opaque black enamel, preferably with good optical properties, especially in terms of opacity (measured by light transmission TLD65 or color difference $\Delta E^*$), and of color (measured by CIELAB color measurement). Furthermore, the enamel must also be able to be deposited easily, in particular by coating, while making it possible to obtain a thin layer, advantageously from 1 to 6 microns, without crazing (fine cracks). The enamels must comprise a glass frit compatible, in particular, with a deposit of very small thickness, and which may allow a content of pigment(s) in the enamel that is compatible with the desired application, so that the difference in the expansion coefficients between, on the one hand, the assembly comprising the frit/pigment(s) mixture and, on the other hand, the glass-ceramic, does not cause the enamel to shatter.

Patent EP 0 776 867 relates to enamel compositions for glass-ceramic, with barium oxide BaO. A minimum content of 2% BaO is essential in the compositions of this patent in order to maintain a good fluidity of the glass. The compositions of this patent also comprise $SiO_2$ contents of greater than 57% in order to avoid risks of degradation by acid agents. The $B_2O_3$ content is low, less than 22%, in order to avoid expansion coefficient values that are too high in the system in question.

Patent US 2009/0155585 relates, in particular, to enamel compositions for a glass-ceramic plate. The enamel compositions of this patent comprise high contents of $SiO_2$, at least 70%, in order to retain sufficiently stable glass frits. The compositions must have a $B_2O_3$ content of less than 22% in order to retain an acceptable resistance to chemical agents (see passage [0034], page 3 of US 2009/0155585). In practice, the examples of this patent all comprise $B_2O_3$ contents of less than 18%.

One subject of the present invention is an enamel composition, in particular intended for covering a glass pane of a fireplace insert, comprising at least one glass frit, at least one pigment in a content varying from 40 to 65% of the total weight of the enamel, preferably from 45 to 60%, and optionally at least one vehicle or medium, characterized in that the glass frit comprises the following constituents, within the limits defined below, limits included (unless otherwise stated), expressed as percentages by weight of the total weight of the frit:

| | |
|---|---|
| $SiO_2$ | 45-65% |
| $Al_2O_3$ | 0-13% |
| $B_2O_3$ | 23-55% |
| $Na_2O$ | 0-10% |
| $K_2O$ | 0-10% |
| $Li_2O$ | 0-10%. |

The inventors have demonstrated that such a composition, in particular with $B_2O_3$ contents that vary from 23 to 55% of the total weight of the frit, has a low thermal expansion coefficient which limits the impact due to the difference in the expansion coefficients between the substrate, preferably a glass-ceramic plate, and the enamel. Such an enamel makes it possible to incorporate an amount of pigment that is compatible with the desired masking effect, preferably for a coating of a thickness of 1 to 6 microns, without crazing or disintegration of the enamel deposited on the glass substrate. The inventors have also shown that the viscosity of such an enamel composition is suitable for the temperature range 750-850° C. used for the heat treatment of the enamel. Such a viscosity also ensures good mechanical strength of the layer, and allows good spreading that ensures a relatively shiny and smooth appearance of the enamel in the final product. The visual appearance obtained is completely satisfactory, given that a shiny enamel is obtained. Furthermore, the ageing tests, evaluated in particular by tribological tests, have shown good mechanical strength of the enamel according to the present invention.

Thus, the inventors have shown that using a glass frit that has the composition defined above is particularly suitable for obtaining an opaque enamel intended, in particular, to be deposited on the fire face of a fireplace insert.

The enamels according to the present invention in particular have the advantage of being able to be deposited on a precursor glass (or mother glass) before ceramization and of being able to be fired during the ceramization, and also have the advantage of being able to withstand high temperatures (allowing, in particular, the use in a fireplace hearth).

Preferably, the glass frit of the enamel composition as described previously comprises an $SiO_2$ content that varies from 47 to 57%.

Preferably, the glass frit of the composition for an enamel frit as described previously comprises an $Al_2O_3$ content that varies from 2 to 8%, advantageously from 3 to 6%.

Preferably, the glass frit of the enamel composition as described previously comprises a $B_2O_3$ content that varies from 27 to 50%, advantageously from 27 to 40%. The compositions described above may advantageously comprise a $B_2O_3$ content that is greater than 30%, preferably 31% or even 32%. Preferably, the $B_2O_3$ content in the glass frit of the enamel according to the present invention is greater than 33% and advantageously, it is greater than 34%. Preferably, the $B_2O_3$ content is greater than 34% and it is less than 45% in the glass frit of the invention.

Preferably, the glass frit of the enamel composition as described previously comprises an $Na_2O$ content that varies from 2.5 to 6%, advantageously from 2 to 5%.

Preferably, the glass frit of the enamel composition as described previously comprises a $K_2O$ content that varies from 0.5 to 3%, advantageously from 1 to 2%.

Preferably, the glass frit of the enamel composition as described previously comprises an $Li_2O$ content that varies from 2 to 6%, advantageously from 3 to 5%.

More preferably, the enamel composition as described previously does not contain at least one of the elements selected from $ZrO_2$, BaO, MgO, CaO and SrO: the inventors have observed that the enamel compositions according to the invention that are free of these oxides have physicochemical properties that are compatible for the desired application, especially a good viscosity. Advantageously, the BaO-free compositions do not require this oxide to be handled, the chemical risk of which, linked to the use thereof, is well established (file INRS FT 125). The frit composition according to the present invention may not contain any of these four oxides.

Preferably, when the enamel comprises $TiO_2$, the weight content thereof in the enamel does not exceed 5%, advantageously it is less than 2%, or even it is less than 1%.

All the possible combinations of the aforementioned constituents are also part of the present invention.

Preferably, the glass frit of the enamel composition as described previously is exclusively constituted of:

| | |
|---|---|
| $SiO_2$ | 45-65% |
| $Al_2O_3$ | 0-13%, preferably 2-8% |
| $B_2O_3$ | 23-55% |
| $Na_2O$ | 0-10%, preferably 2.5-6% |
| $K_2O$ | 0-10%, preferably 0.5-3% |
| $Li_2O$ | 0-10%, preferably 2-6%. |

Advantageously, the composition described above, which may contain only the six oxides, comprises an $SiO_2$ content that varies from 47 to 57%.

Advantageously, the composition described above, which may contain only the six oxides, comprises a $B_2O_3$ content that varies from 27 to 50%, advantageously from 27 to 40%. The compositions described above may advantageously comprise a $B_2O_3$ content that is greater than 30%, preferably 31%, or even 32%.

Advantageously, the composition described above, which is composed solely of the six oxides, may comprise $Al_2O_3$ in a content that varies from 3 to 6%, $Na_2O$ in a content that varies from 2 to 5%, $K_2O$ in a content that varies from 1 to 2%, and/or $Li_2O$ in a content that varies from 3 to 5%.

All the possible combinations of the aforementioned constituents are also part of the present invention.

More preferably still, the glass frit of the enamel composition as described previously is exclusively constituted of:

| | |
|---|---|
| $SiO_2$ | 47-57% |
| $Al_2O_3$ | 3-6% |
| $B_2O_3$ | 27-40% |
| $Na_2O$ | 2-5% |
| $K_2O$ | 1-2% |
| $Li_2O$ | 3-5%. |

Preferably, the glass frit and the pigment(s) of the enamel composition as described previously comprise particles having a particle size that varies from 1 to 6 microns: such an enamel, with pigment particles having a content which varies from 40 to 65% as a weight percentage, preferably from 45 to 60% (as seen previously), makes it possible to obtain a sufficient opacity without having to lay down too great a thickness. Thus the impact of the difference in expansion coefficient between the substrate and the enamel is limited, which helps to prevent crazing.

"Crazing" is a phenomenon that consists of a fine cracking of the layer of enamel during the cooling thereof.

Advantageously, the ratio between the two types of particles, that is to say (% frit)/(% pigment), is 50/50. In other words, the relative (weight) contents of frit and of pigment are 50% each, which makes it possible to ensure an optimum coating of the enamel particles taking into account the "void" fraction that exists in a random close packing of grains (around 40%) while ensuring the opacity thereof.

The enamel according to the invention preferably comprises at least one opaque black pigment. Advantageously, it is possible to use commercial opaque black pigments comprising either oxides of chromium, iron, cobalt and nickel (for example, Co—Cr—Fe—Ni spinels such as the black pigment sold by Ferro™ under the reference 240137), or oxides of chromium and copper (for example, Cr—Cu spinels).

Mention may also be made of the black pigments based on $MnO_2$, $Fe_2O_3$ and/or CoO.

Mention may also be made of other pigments which may be used, alone or in combination, in the enamel composition according to the invention, based on: NiO (green), $Cr_2O_3$ (green), $TiO_2$ (white), and/or oxides such as the Cr—Al spinel (pink), the Sn—Sb—V rutile (gray), the Ti—Sb—Ni rutile (yellow), the Zr—V baddeleyite (yellow), the Co—Zn—Al spinel (blue), the Zn—Fe—Cr spinel (brown), and/or silicates such as the Ca—Cr—Si garnet (green), the Ca—Sn—Si—Cr sphene (pink), the Zr—Si—Fe zircon (pink), the Co—Zn—Si willemite (dark blue), and/or the Co—Si olivine (dark blue).

All the combinations of the aforementioned pigments in the enamel according to the invention are also possible. A person skilled in the art in the field of enamels knows how to incorporate such pigments into the enamel during the preparation thereof.

Another subject of the present invention is a screen-printing process for applying an enamel as described previously to a substrate, such as a glass-ceramic plate.

Preferably, a layer of enamel is deposited on the glass substrate in order to obtain a thickness less than or equal to 15 microns before firing.

Advantageously, the screen-printing process according to the invention described previously is carried out by depositing layers of enamel onto the glass substrate, such as a glass-ceramic plate, so as to obtain a thickness less than or equal to 10 microns after firing, and more advantageously still in order to obtain a thickness less than or equal to 6 microns after firing.

The enamels according to the present invention make possible the deposition in as few passes as possible over a small thickness, which makes it possible to prevent the enamel from chipping and mechanically damaging the glass-ceramic plate.

The substrate, preferably a glass-ceramic plate, is coated by screen printing on its upper face with a paste comprising the enamel composition according to the invention (the enamel paste comprises, besides the powder composed of frit and of pigments, a medium based on an acrylic resin and on pine oil sold under the reference MX54 by Ferro in view of its deposition on the substrate, said medium being consumed at the latest during the firing of the enamel) using screen-printing screens composed of fabrics with yarns made of polyester or polyamide, either before ceramization, or after ceramization, then dried at around 100-150° C.

Another subject of the present invention is a glass-ceramic plate covered with an enamel as described previously.

Advantageously, the substrate, in particular the glass-ceramic plate, coated with the enamel (obtained after firing) according to the invention has an opacity such that it allows, in particular, the masking of underlying elements. The opacity is evaluated within the context of the present invention by measuring (colorimetry in reflection carried out using a Byk-Gardner Color Guide 45/0 colorimeter) the color variation $\Delta E^*$, which corresponds to the difference between the color, measured on the face of the substrate opposite the face bearing the enamel, for the substrate placed on an opaque white background, and that for the substrate placed on an opaque black background ($\Delta E^* = ((L_B^* - L_N^*)^2 + (a_B^* - a_N^*)^2 + (b_B^* - b_N^*)^2)^{1/2}$ according to the formula established in 1976 by the CIE, $L_B^*$, $a_B^*$, and $b_B^*$ being the colorimetric coordinates of the first measurement on a white background and $L_N^*$, $a_N^*$, and $b_N^*$ being those of the second measurement on a black background). Advantageously, the glass-ceramic substrate coated with the enamel according to the invention has a value of $\Delta E^*$ of less than or equal to 0.5, preferably of less than or equal to 0.4.

Preferably, the glass-ceramic plate covered with an enamel as described previously is a fireplace insert.

Advantageously, the face bearing the enamel is intended to be placed on the fire side.

Other colorimetric tests, carried out with the same equipment as mentioned above, and on the enamel face of the glass-ceramic plate covered with the enamel according to the present invention, have made it possible to measure the corresponding coordinates L*, a* and b*. Advantageously, for the desired application, the value of L* measured should be less than 25, or even 21, and preferably L* should be between 12 and 18. Such values of L* result in an absence of porosity for the enamel on the glass substrate.

The present invention and its advantages will be better understood on reading the following examples, given solely by way of illustration and which cannot in any case be considered to be limiting.

EXAMPLES

TABLE 1

The numerical values assigned to the oxides and to the pigments correspond to percentages by weight.

| Enamel: 50% opaque black pigment | Sample No. | | | | |
| --- | --- | --- | --- | --- | --- |
| | C1 | C2 | 1 | 2 | 3 |
| SiO$_2$ | 63 | 64 | 56.46 | 55.38 | 48.72 |
| Al$_2$O$_3$ | 6.60 | 6.50 | 5.92 | 3.08 | 12.72 |
| Na$_2$O | 3.30 | 5.50 | 2.95 | 5.62 | 5.80 |
| K$_2$O | 1.80 | 1.00 | 1.62 | 8.54 | 1.47 |
| B$_2$O$_3$ | 20.50 | 16.00 | 23.75 | 27.37 | 28.25 |
| Li$_2$O | 4.80 | 5.00 | 4.30 | 0.00 | 3.03 |
| Fe$_2$O$_3$ | — | — | 5.00 | — | — |
| BaO | — | 2.00 | — | — | — |
| Total for the frit | 100.00 | 100.00 | 100.00 | 100.00 | 100.00 |
| Appearance of the enamel | matt | matt | — | shiny | shiny |
| Crazing | yes | yes | no | no | no |
| Abrasion resistance | mediocre | yes | average | yes | yes |
| Opacity: $\Delta E^*$ | 0.32 | 0.27 | 0.57 | 0.18 | 0.22 |
| Colorimetry/ enamel face: L* (a*, b*) | 25.85 (0.60, 0.19) | 26.95 (0.29, 0.30) | 26.72 (0.54, 0.09) | 16.21 (0.72, 0.57) | 20.65 (0.54, 0.27) |

TABLE 2

The numerical values assigned to the oxides and to the pigments correspond to percentages by weight.

| Enamel: 50% opaque black pigment | Sample No. | | | | |
| --- | --- | --- | --- | --- | --- |
| | C1 | C2 | 4 | 5 | 6 | 7 |
| SiO$_2$ | 63 | 64 | 55.47 | 53.90 | 39.75 | 47.55 |
| Al$_2$O$_3$ | 6.60 | 6.50 | 5.81 | 3.33 | 12.55 | 4.98 |
| Na$_2$O | 3.30 | 5.50 | 2.91 | 3.03 | 5.72 | 2.49 |
| K$_2$O | 1.80 | 1.00 | 1.58 | 1.54 | 1.45 | 1.36 |
| B$_2$O$_3$ | 20.50 | 16.00 | 30.00 | 34.10 | 37.52 | 40.00 |
| Li$_2$O | 4.80 | 5.00 | 4.23 | 4.08 | 3.00 | 3.62 |

TABLE 2-continued

The numerical values assigned to the oxides and to the pigments correspond to percentages by weight.

Enamel: 50% opaque

| black pigment | Sample No. | | | | | |
|---|---|---|---|---|---|---|
| | C1 | C2 | 4 | 5 | 6 | 7 |
| $Fe_2O_3$ | — | — | — | — | — | — |
| BaO | — | 2.00 | — | — | — | — |
| Total for the frit | 100.00 | 100.00 | 100.00 | 100.00 | 100.00 | 100.00 |
| Appearance of the enamel | matt | matt | — | shiny | shiny | shiny |
| Crazing | yes | yes | no | yes, slight | no | no |
| Abrasion resistance | mediocre | yes | yes | yes | yes | yes |
| Opacity: $\Delta E^*$ | 0.32 | 0.27 | 0.74 | 0.20 | 0.08 | 0.36 |
| Colorimetry/enamel face: $L^*$ ($a^*$, $b^*$) | 25.85 (0.60, 0.19) | 26.95 (0.29, 0.30) | 20.33 (0.75, 0.28) | 13.49 (0.73, 0.75) | 15.78 (0.87, 0.54) | 17.55 (0.89, 0.52) |

Tables 1 and 2 give results of comparative tests between enamel compositions according to the invention deposited by screen printing on a glass-ceramic plate, corresponding respectively to samples 1 to 7, and enamel compositions deposited on glass-ceramic in the same way, and that are obtained from a glass frit of the prior art, corresponding respectively to samples C1 and C2 (the results obtained for samples C1 and C2 from the frit of the prior art have been listed in both tables).

The various samples, the numbers of which correspond to the compositions listed in tables 1 and 2, were prepared as follows:

The frit, comprising the oxides listed in tables 1 or 2, is conventionally obtained by melting a mixture of suitable (natural or synthetic) raw materials at high temperature (above 1000° C.), then the frit is milled using a ball mill in order to obtain a particle size of 8 to 12 microns. The pigments are incorporated in order to obtain a frit/pigment weight ratio=1. The pigments used in all cases are the Co—Cr—Fe—Ni spinel and Cr—Cu spinel commercial pigments (they both gave identical results listed in table 1). The assembly is then micromilled in order to obtain grains having a particle size that varies from 5 to 6 microns.

A pasting of the powder obtain is then carried out in the Ferro MX54 medium (the amount of medium varies from 40 to 60% of the total weight of the mixture). Then, on a transparent glass-ceramic plate, a thickness of 10 to 15 microns of the paste obtained during the pasting is deposited by screen printing. The assembly is fired at a temperature of 800° C. for a duration of half an hour to one hour. The thickness of the enamel layer obtained after firing on the glass substrate varies between 4 and 6 microns (only in the case of sample C2 was a thickness of 8 microns obtained after firing).

Tribological and colorimetric tests were carried out. For the tribological tests, the abrasion resistance (see tables 1 and 2) corresponds to the behavior of the enamel after 10 back-and-forth passes carried out using a moistened highly abrasive pad (Spontex® red pad).

The results obtained are listed in tables 1 and 2. The values assigned to the oxides are expressed as percentages by weight relative to the total composition of the frit.

In all cases, all the enamels according to the invention tested, incorporating frits having a high content of boron oxide, displayed a shiny appearance that is very satisfactory for the desired application. Conversely, the enamels prepared according to the same protocol from the frit of the prior art are matt.

In almost all cases, no crazing was observed on the enamels according to the invention that were tested, prepared from frits having high contents of boron oxide (only sample 7 displayed crazing). Conversely, the enamels prepared according to the same protocol from a frit of the prior art displayed crazing.

The results of the abrasion tests are also satisfactory for all of the samples of enamels according to the invention that were evaluated. They displayed good mechanical strength on the glass-ceramic plate.

Regarding the results of the colorimetric tests, the value of $L^*$ that makes it possible to determine if an enamel of satisfactory porosity is obtained was measured on the enamel side (the values of the other colorimetric coordinates $a^*$ and $b^*$ are added afterwards between parentheses, by way of indication). Here too, and just like the values obtained for $\Delta E^*$ for measuring the opacity, results are obtained that confirm the conformity between the properties of the enamel according to the invention and the desired use.

Tests were also carried out starting from the frit used to prepare sample 7, in order to evaluate what relative proportions of frit with respect to the pigment make it possible to obtain an enamel with optical and mechanical properties compatible with the desired use. The enamel is obtained from the frit of example 7 by following the protocol explained in detail above in the experimental section, and by using the Co—Cr—Fe—Ni spinel black pigment sold by Ferro$^{TM}$ under the reference 240137. Table 3 shows the results obtained.

TABLE 3

The percentages correspond to percentages by weight.

| | 7 (50% frit of sample 7 and 50% pigment) | 8 (30% frit of sample 7 and 70% pigment) | 9 (61% frit of sample 7 and 39% pigment) |
|---|---|---|---|
| Appearance of the enamel | shiny | matt | shiny |
| Abrasion resistance | yes | poor | yes |
| Opacity: $\Delta E^*$ | 0.36 | 0.30 | 1.39 |
| Colorimetry/ enamel face: $L^*$ ($a^*$, $b^*$) | 17.55 (0.89, 0.52) | 23.36 (0.55, 0.16) | 10.80 (0.84, 1.18) |

It is observed that a high pigment content, typically of the order of 70% by weight relative to the frit (sample 8), degrades the abrasion resistance of the enamel (10 back-and-forth passes made using a moistened highly abrasive pad identical to that described above). A low pigment content, typically less than 40% by weight relative to the frit (sample 9), results in an enamel that is insufficiently opaque since the value obtained for ΔE* is much higher than 0.5.

The invention claimed is:

1. An enamel composition, comprising:
   a glass frit;
   a pigment in a content varying from 40 to 65% of the total weight of the enamel composition; and
   optionally a vehicle or medium,
   wherein the glass fit comprises, expressed as percentages by weight of the total weight of the glass frit:

| | |
   |---|---|
   | $SiO_2$ | 45-65%; |
   | $Al_2O_3$ | 0-13%; |
   | $B_2O_3$ | greater than 30%; |
   | $Na_2O$ | 0-10%; |
   | $K_2O$ | 0-10%; and |
   | $Li_2O$ | 0-10%. |

2. The enamel composition of claim 1, wherein the glass frit comprises a $SiO_2$ content of from 47 to 57%.

3. The enamel composition of claim 1, wherein the glass frit comprises an $Al_2O_3$ content of from 2 to 8%.

4. The enamel composition of claim 1, wherein the glass frit comprises a $B_2O_3$ content of from greater than 31% to 50%.

5. The enamel composition of claim 1, wherein the glass fit comprises an $Na_2O$ content of from 2.5 to 6%.

6. The enamel composition of claim 1, wherein the glass frit comprises a $K_2O$ content of from 0.5 to 3%.

7. The enamel composition of claim 1, wherein the glass frit comprises a $Li_2O$ content of from 2 to 6%.

8. The enamel composition of claim 1, wherein the enamel composition does not contain at least one selected from the group consisting of $ZrO_2$, BaO, MgO, CaO and SrO.

9. The enamel composition of claim 1, wherein the glass fit consists of:

| | |
   |---|---|
   | $SiO_2$ | 45-65%; |
   | $Al_2O_3$ | 0-13%; |
   | $B_2O_3$ | greater than 31%; |
   | $Na_2O$ | 0-10%; |
   | $K_2O$ | 0-10%; and |
   | $Li_2O$ | 0-10%. |

10. The enamel composition of claim 1, wherein the glass frit consists of:

| | |
    |---|---|
    | $SiO_2$ | 47-57%; |
    | $Al_2O_3$ | 3-6%; |
    | $B_2O_3$ | greater than 32%; |
    | $Na_2O$ | 2-5%; |
    | $K_2O$ | 1-2%; and |
    | $Li_2O$ | 3-5%. |

11. The enamel composition of claim 1, wherein the glass frit and the pigment comprise particles having a particle size that varies from 1 to 6 microns.

12. The enamel composition of claim 1, wherein relative contents of the glass frit and the pigment are 50% each.

13. The enamel composition of claim 1, wherein the pigment is an opaque black pigment.

14. A screen-printing process, the process comprising applying the enamel composition of claim 1 to a glass substrate and firing, to obtain a thickness of less than or equal to 10 microns after the firing.

15. A glass-ceramic plate covered with the enamel composition of claim 1.

16. The glass-ceramic plate of claim 15, wherein:
    the glass-ceramic plate is a fireplace insert; and
    a face of the glass-ceramic plate bearing the enamel composition is suitable to be placed on the fire side.

17. The enamel composition of claim 1, which is suitable for covering a glass pane of a fireplace insert.

18. The enamel composition of claim 1, comprising 45 to 60% of the pigment, based on the total weight of the enamel composition.

19. The enamel composition of claim 1, wherein the glass frit comprises an $Al_2O_3$ content of 3 to 6%.

20. The enamel composition of claim 1, wherein the glass frit consists of:

| | |
    |---|---|
    | $SiO_2$ | 45-65%; |
    | $Al_2O_3$ | 2-8%; |
    | $B_2O_3$ | greater than 33%; |
    | $Na_2O$ | 2.5-6%; |
    | $K_2O$ | 0.5-3%; and |
    | $Li_2O$ | 2-6%. |

* * * * *